Oct. 4, 1938.   W. H. PRATT   2,132,271
WATT-HOUR METER
Filed Aug. 13, 1937   2 Sheets-Sheet 1
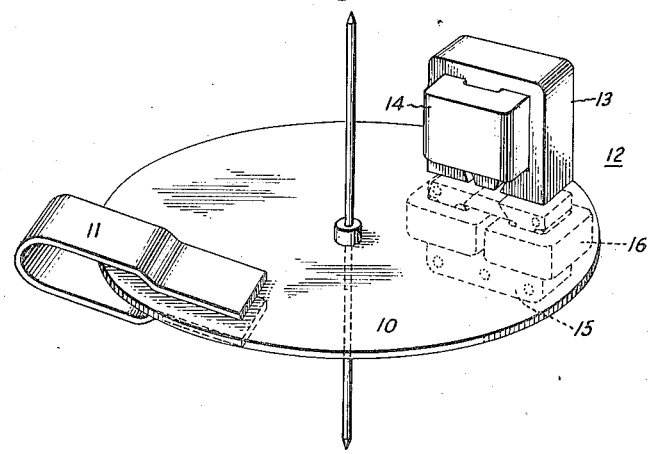
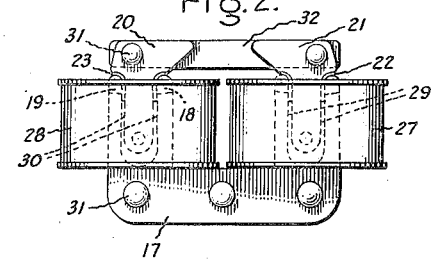
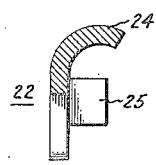
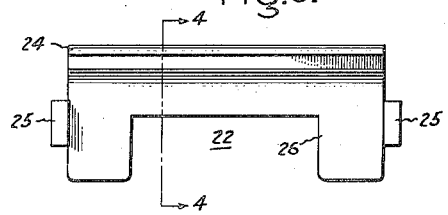
Inventor:
William H. Pratt,
by Harry E. Dunham
His Attorney.

Oct. 4, 1938.  W. H. PRATT  2,132,271
WATT-HOUR METER
Filed Aug. 13, 1937  2 Sheets-Sheet 2
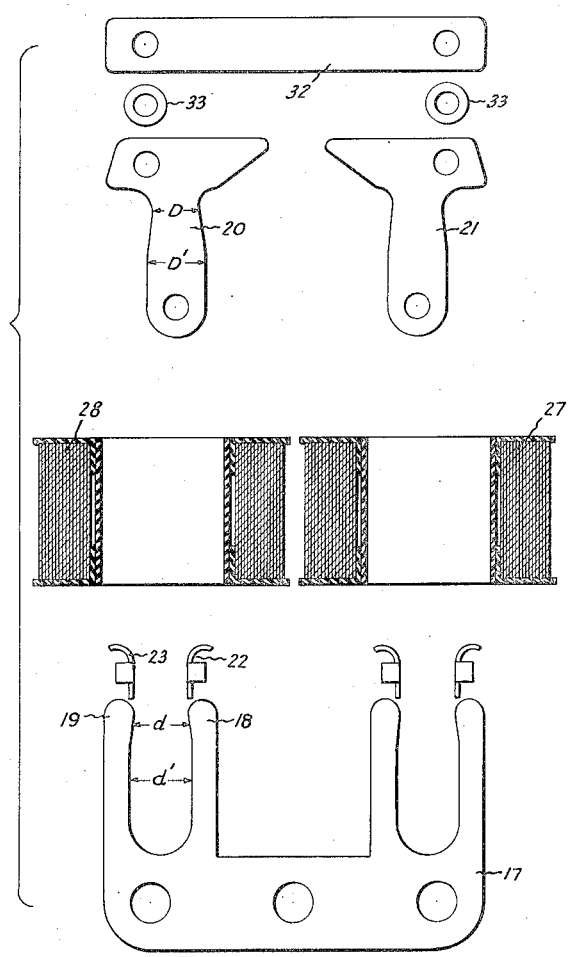
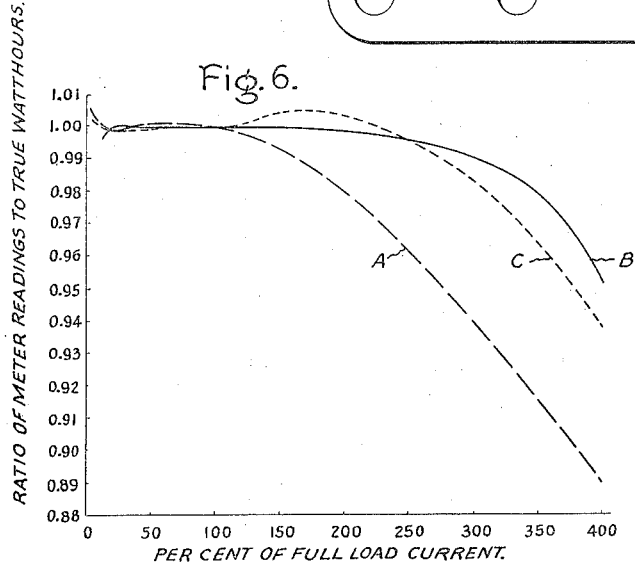
Inventor:
William H. Pratt,
by Harry E. Dunham
His Attorney.

Patented Oct. 4, 1938

2,132,271

UNITED STATES PATENT OFFICE 2,132,271

WATT-HOUR METER

William H. Pratt, Lynn, Mass., assignor to General Electric Company, a corporation of New York Application August 13, 1937, Serial No. 158,941

5 Claims. (Cl. 171—264)

My invention relates to metering devices of the watt-hour type, principally watt-hour meters, and it concerns primarily an improved construction of the current electromagnet for such meters for the purpose of facilitating assembly and for obtaining improved overload compensation results consistently. The current electromagnet of my invention may be used to replace current electromagnets on old meters to improve greatly overload accuracy and extend the load range of such meters.

The features of my invention which are believed to be novel and patentable will be pointed out in the claims appended hereto. For a better understanding of my invention, reference is made in the following description to the accompanying drawings showing, in Fig. 1, a watt-hour meter assembly to which my invention is applied. Fig. 2 represents a current electromagnet assembly embodying my invention; Fig. 3 is a side view of a nonmagnetic spacer which is used between the pole-piece parts and yoke of my improved current electromagnet; Fig. 4 is a sectional view taken on line 4—4 of Fig. 3; Fig. 5 shows an exploded side view of the various parts of the current electromagnet preparatory to assembly; and Fig. 6 shows load accuracy curves that will be referred to in explaining the load accuracy characteristics afforded by my invention.

My invention is generally used in induction watt-hour meters of the type shown in Fig. 1 where 10 represents a rotary disk of nonmagnetic conducting material, such as copper or aluminum, 11 a permanent magnet used to produce magnetic damping on the armature disk, and 12 an induction driving element. In polyphase meters, there may be two or more such driving elements operating on the same or separate disks. Such a driving element comprises a voltage electromagnet with its core 13 and coil 14 on one side of the disk and a current electromagnet with its core 15 and coils 16 on the opposite side of the disk. The pole pieces of these electromagnets face each other with the armature disk between them and their fluxes produce eddy currents in the disk that react with the fluxes to produce a driving torque proportional to watts. Light load and lag plates are also used in the flux paths but these plates have been omitted from the drawings for the sake of clearness. They do not constitute any novelty with respect to the present invention.

In meters of this type, the voltage flux does not vary greatly but the current flux varies over a very wide range from a zero value at no load upward and, if the meter is to be accurate over very wide current load ranges, compensation with respect to the current flux is necessary. The current flux in addition to producing a driving torque in conjunction with the voltage flux produces a certain amount of damping, which varies with the current load, becomes pronounced at heavy loads, and limits the useful load range of the meter. The useful accurate load range of such meters may be greatly extended by what is known as overload compensation, as described in United States Patent No. 1,727,509, September 10, 1929, Kurz et al. Such compensation is obtained by shunting a decreasing percentage of the current flux away from the disk armature as the current load rises. This is accomplished by using a magnetic shunt suitably placed between the pole pieces of the current electromagnet, which shunt is designed to become saturated at heavy current loads. Best results are obtained when the magnetic circuit to be compensated contains appreciable reluctance, as, for example, an air gap or its equivalent. These principles, explained in the above-mentioned patent, are employed in my invention which concerns an improved current electromagnet structure.

The assembled current electromagnet embodying the present invention is represented in Fig. 2 and its component parts are more clearly shown in Figs. 3, 4, and 5. The current magnet comprises a U-shaped magnetic yoke portion 17, each upright leg of which is cut out in the shape of a U with the open part upward. The upper ends 18 and 19 of each upwardly extending pair of fingers of the yoke have slightly rounded enlargements on their inner surfaces so that the opening at $d$ between the upper ends 18 and 19 is slightly less than the opening at $d'$ before the pole piece portions 20 and 21 are inserted into these openings.

Nonmagnetic spacer parts 22 and 23 are provided to fit between the finger ends 18 and 19 and the pole pieces 20 and 21 when the latter are inserted to provide a definite air gap between the yoke portions and pole-piece portions of the magnet. The spacers may be made of brass sheet material about .03 inch in thickness with rounded upper edges 24 and with clip extensions 25 at either end, as best shown in Figs. 3 and 4. The body portion may be cut out in the center as indicated at 26 to save material and reduce eddy current losses to a minimum. These spacer clips are clipped over the inner ends 18 and 19 of the upwardly extending fingers of the yoke portion and are retained in position by the clip extensions 25, the distance between these clip extensions on each spacer being slightly less, in the unsprung condition of the clip, than the depth of the fingers 18 and 19 so that the clip will cling to the fingers preparatory to insertion of the pole-piece parts 20 and 21.

The prewound coils 27 and 28 are next slipped over the two main legs of the yoke and then the T-shaped pole-piece parts 20 and 21 are forced into the U-shaped openings to the positions shown in Fig. 2. The width D at the neck of the pole-piece legs is less than the width D' of the lower portion of such legs and these dimensions are such that, when the pole pieces are inserted in place, the yoke finger parts at 18 and 19 are sprung apart slightly and the pole pieces are resiliently locked in place with the spacer parts 22 and 23 secured in place and creating definite reluctance air gaps 29 and 30 in the magnet assembly.

It is seen that the U-shaped electromagnet has a magnetic circuit made by a yoke part and pole-piece parts which are in effect dovetailed together in interlocking relation, although the resiliency of the side wall portions of the dovetailed yoke sections permits the assembly of the dovetailed parts in the manner of inserting a plug into a socket. The coils may thus be prewound and slipped in place before the dovetail connection is made but without interfering with the subsequent telescoping assembly of the core parts. The nonmagnetic spacer shims at the throat of the dovetail connection provide the necessary reluctance gap in the magnetic circuit and also assure a tight fit between the assembled parts.

The yoke 17 and pole-piece parts 20 and 21 are of laminated magnetic material of the usual grade and the laminations of the different parts are held together by rivets or bolts 31. A magnetic shunt 32 designed to become saturated before the load limit of the meter is reached is assembled between the pole pieces of the current magnet but is spaced from direct contact with the pole pieces by nonmagnetic washers 33. The upper rivets 31 for securing the laminations of the pole-piece parts may be used also for securing the shunt 32. Spacing of the shunt 32 from the pole pieces is to prevent shunting of all of the flux at light loads.

It is seen that the structure permits of the use of coils 28 and 29, which are prewound by machinery and which may be slipped over the yoke extensions prior to assembly of the pole pieces. These coils may be wound of varnished copper strip, the width of the strip being the same as the height of the coils, as indicated. The structure permits room for a large ampere turn current winding consistent with the heavy load accuracy range afforded by the overload compensation. The pole-piece parts 20 and 21 and the spacer clips 22 and 23 are securely held together by the resilient locking relation of the parts and it is not essential that additional fastening means be employed. The air gap dimensions of the reluctance gaps 29 and 30 are determined primarily by the outlines of the respective punchings 17, 20 and 21 in cooperation with the spacer clips 22 and 23. Since the dies for punching the parts can readily be made very accurately the air gap reluctance can be given a very definite value irrespective of the manipulation of assembly. The upper curved edges 24 of these spacer strips also determine the distance to which the pole pieces can be inserted into the sockets in the yoke. No exacting carefulness is required in assembling the parts to obtain a specified gap reluctance in the magnetic circuit. Thus, the structure results in obtaining consistent overload compensation characteristics without the expense incident to holding to exacting dimensions in punching the laminations and critical inspection during assembly. The total area of the reluctance gaps 29 or 30 between the yoke portion and the pole-piece portions is more than double the cross-sectional area of the magnetic circuit because of the overlapping manner of assembly and this is believed to contribute to improved characteristics. The T-shaped pole-piece parts may be pulled out should it become necessary to change or repair the coils for any reason or to make a change in the reluctance gap by the use of spacer strips of slightly different thickness.

A meter having magnetic circuits generally similar to the meter shown in Fig. 1 but without overload compensation and without the reluctance gaps in the current magnet core has a load accuracy curve such as is shown in curve A, Fig. 6. There are a great many such meters in use in the United States today that were installed as far back as 1914. Such a meter is shown in United States Patent No. 1,180,794, April 25, 1916, to Morganthaler and myself. When installed, the load on the metered circuits was generally well within the accepted load accuracy range of the meter, for example, up to two hundred per cent load on the Fig. 6 curve. However, due to the added use of various types of electrical appliances in recent years, the loads on these circuits have crept upward until the meter no longer has acceptable accuracy except when the circuit is lightly loaded.

One important use of the present invention is the replacing of the current electromagnet of such existing meters with the current electromagnet of the present invention. The meter, when so modified, has a load accuracy curve corresponding to curve B, Fig. 6. The range of current over which the meter will operate with accepted accuracy is about doubled and a substantial portion of the expense that would have been involved in installing an entirely new meter capable of taking care of the increased load has been saved. Curve C of Fig. 6 indicates the type of load accuracy curve that would be obtained in this type of meter by employing the overload saturable shunt 32 but without providing the reluctance gaps 29 and 30. In such a case, the shunt saturates too abruptly with increase in load for satisfactory results and first causes the meter to operate slightly fast between about one hundred and fifty and two hundred per cent load and then to lose its influence rapidly at higher current loads.

While the invention is particularly useful as a replacement current electromagnet for induction watt-hour meters, it is also useful in new meters where it may be used in conjunction with other modern meter improvements.

I do not wish to limit my invention to the exact mechanical interlocking arrangement between the yoke and pole-piece portions which has been represented and described. Other equivalent arrangements which accomplish the same results may be used and are intended to be embodied within the scope of the appended claims.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A current electromagnet for watt-hour meters comprising a U-shaped magnetic member having the upright limbs cut out in a U shape to form sockets therein, T-shaped pole-piece parts having their upright limbs inserted into the sockets, nonmagnetic spacers separating the inner walls of the sockets from the pole-piece parts, said parts being dimensioned to fit together in interlocking telescoping relation, current coils surrounding the telescoped portions of said magnetic parts, and a magnetic shunt designed to become saturated by the flux of said current electromagnet in bridging relation between the pole-piece parts but spaced therefrom by a narrow air gap.

2. A current electromagnet for watt-hour meters comprising a U-shaped magnetic yoke part and a pair of T-shaped magnetic pole-piece parts, the upright limbs of the yoke part and the upright portion of the pole-piece parts being shaped and dimensioned to fit together in a loose dovetail relation, nonmagnetic spacer members inserted between the dovetailed parts to produce a tight fit between such parts and to provide reluctance gaps between the yoke part and the pole-piece parts, current coils surrounding the dovetailed portions of said magnetic parts for producing a current flux at the pole pieces, and magnetic means for shunting a portion of the flux between said pole pieces at light load, said means being designed to become magnetically saturated and shunt a decreasing portion of the flux of said electromagnet as the load increases.

3. A current electromagnet for watt-hour meters comprising a U-shaped magnetic yoke part and T-shaped magnetic pole-piece parts, the upright limbs of the yoke part being cut out to leave slightly dovetailed shaped openings with resilient side walls and the downward extending portions of the pole-piece parts being shaped to loosely fit into said openings in dovetail relation, nonmagnetic spacer members adapted to be inserted between the pole-piece parts and the yoke part at the throat of the dovetail to produce a tight interlocking joint between such parts and to form a reluctance gap in the magnetic circuit between them, the resiliency of the side wall sections of the dovetailed yoke portions permitting the insertion of the pole-piece parts therein with the spacer members in place, in the manner of inserting a plug into a socket, and allowing them to spring back to form a tight joint, current coils embracing the dovetailed portions of the magnet thus formed, and a saturable magnetic shunt member spaced from the pole pieces to shunt a decreasing portion of the flux of said electromagnet as the current flux thereof increases.

4. In a watt-hour meter, a current electromagnet therefor comprising a U-shaped magnet having a yoke portion and separate pole-piece portions, each joined to the yoke portion by dovetailed interlocking socket connections, nonmagnetic spacer shims between said parts at the throat portion of the dovetail connections to provide a reluctance gap in the magnetic circuit of said electromagnet, current coils for said electromagnet embracing the dovetailed junctions therein, and a magnetic shunt designed to become saturated secured in spaced relation from and between the pole pieces of said electromagnet to provide overload current compensation.

5. In a watt-hour meter, a current electromagnet therefor comprising a U-shaped magnet having a yoke portion and separable pole-piece portions, said pole-piece and yoke portions having extensions which overlap each other, nonmagnetic spacers between such overlapping portions to provide a reluctance gap and a tight mechanical interlocking joint between such portions, current coils surrounding the overlapping portions of said magnet, and a magnetic shunt extending between the pole-piece portions but separated from each by a narrow gap and designed to become saturated gradually as the flux of said electromagnet increases beyond a predetermined value.

WILLIAM H. PRATT.